United States Patent Office 3,099,657
Patented July 30, 1963

3,099,657
Δ³,⁵-PREGNADIENE DERIVATIVES
John A. Zderic, Palo Alto, Calif., Otto Halpern, Mexico City, Mexico, and Jose Iriarte, Zurich, Switzerland, assignors, by mesne assignments, to Syntex Corporation, a corporation of Panama
No Drawing. Filed Feb. 26, 1962, Ser. No. 175,811
17 Claims. (Cl. 260—239.55)

The present invention relates to novel cyclopentanophenanthrene derivatives and to a process for the production thereof.

More particularly the present invention relates to novel 6-methyl-Δ³,⁵-pregnadiene derivatives.

The novel compounds of the present invention which are progestational agents with anti-estrogenic, anti-gonadotrophic and anti-ovulatory properties are represented by the following formula:

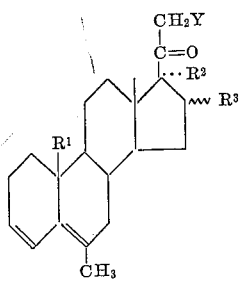

In the above formula Y represents hydrogen or fluorine; $R^1$ represents hydrogen or methyl; $R^2$ represents hydroxyl or a hydrocarbon carboxylic acyloxy group of less than 12 carbon atoms; $R^3$ represents hydrogen, α-methyl, β-methyl, α-hydroxy or α-acyloxy; in addition $R^2$ and $R^3$ together may represent the group:

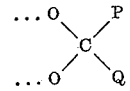

wherein P may be a lower alkyl group and Q represents a lower alkyl, or an aryl or aralkyl group, each of up to 8 carbon atoms.

The acyloxy groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention are prepared by the process exemplified by the following equation:

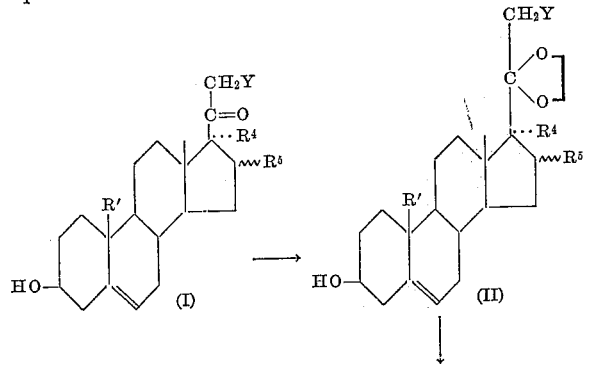

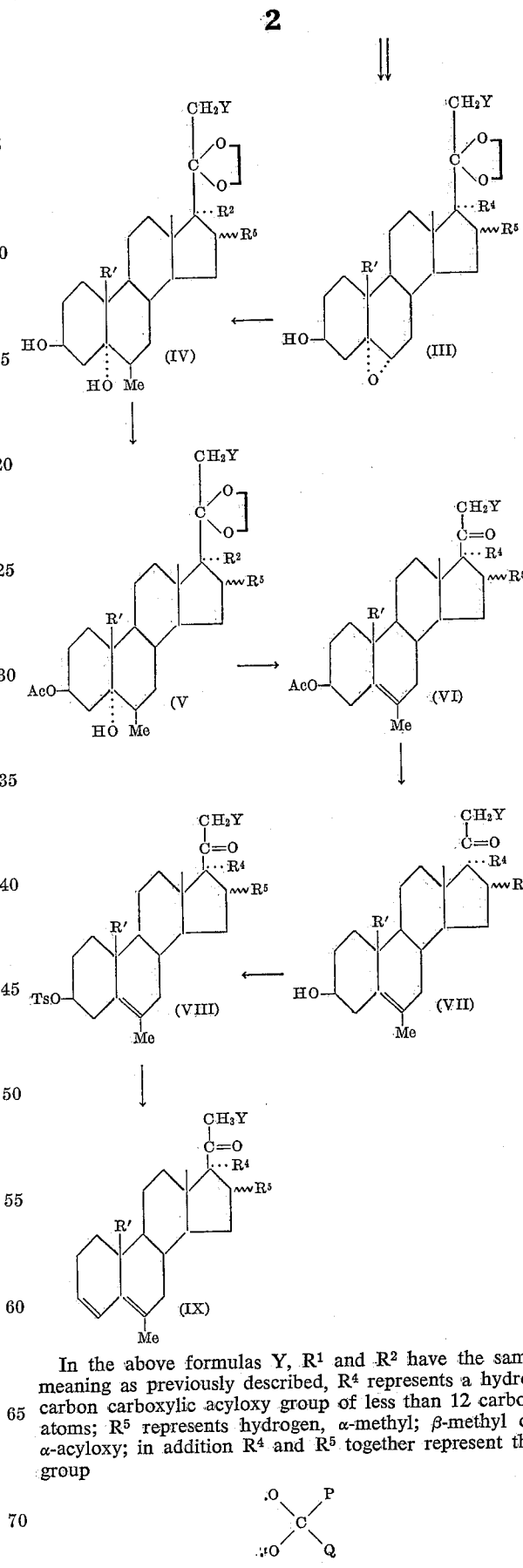

In the above formulas Y, $R^1$ and $R^2$ have the same meaning as previously described, $R^4$ represents a hydrocarbon carboxylic acyloxy group of less than 12 carbon atoms; $R^5$ represents hydrogen, α-methyl; β-methyl or α-acyloxy; in addition $R^4$ and $R^5$ together represent the group

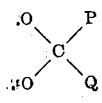

wherein P and Q have the same meaning as previously set forth and Ac represents the acetyl group. There are also contemplated within the scope of the present invention compounds wherein $R^2$ and $R^4$ represent hydrogen.

In practicing the process outlined above, the starting compound which is a $\Delta^5$-pregnen-3$\beta$-ol-20-one derivative (I) is treated with ethylene glycol to form the corresponding 20-cycloethylenedioxy-$\Delta^5$-pregnen-3$\beta$-ol derivative (II). This compound is treated with an organic peracid, preferably with monoperphthalic acid, thus yielding the respective 20-cycloethylenedioxy-5$\alpha$,6$\alpha$-oxido pregnan-3$\beta$-ol compound (III), which upon reaction with a methyl magnesium halide, preferably the bromide, affords the corresponding 20-cycloethylenedioxy-6$\beta$-methyl-pregnan-5$\alpha$,3$\beta$-diol(IV). The latter is conventionally acylated, preferably with acetic anhydride in pyridine, to give the respective 3$\beta$-monoacetate (V) which upon treatment with acetic anhydride in the presence of an acid, preferably sulfuric acid, furnishes the corresponding 6-methyl-$\Delta^5$-pregnen-3$\beta$-ol-20-one acetate (VI). The 3-acetate group is hydrolyzed by reaction in a mild basic medium to give the corresponding 3$\beta$-hydroxy steroid (VII). Conventional tosylation of this 3-alcohol in pyridine, followed by treatment of the resulting 3-tosylate (VIII) with sodium acetate in acetic acid yields the corresponding 6-methyl-$\Delta^{3,5}$-pregnadien-20-one compound (IX).

The compounds obtained by the above described procedures, which have a 17$\alpha$-acyloxy group present in the molecule, yield the corresponding 17$\alpha$-free hydroxyl derivative by conventional saponification, preferably with an alkali metal hydroxide.

The final compounds of the present invention having a ketonide at the 16,17-positions produce the 16$\alpha$,17$\alpha$-diols by hydrolysis with a strong acid, preferably formic acid.

The free alcohols thus obtained are conventionally acylated with an excess of an acylating agent, as for example an anhydride derived from a hydrocarbon carboxylic acid of the type described hereinbefore in the presence of p-toluenesulfonic acid, thus affording correspondingly the 17$\alpha$-monoacylates or the 16$\alpha$,17$\alpha$-diacylates. The latter compounds, upon selective saponification in a mild alkaline medium yield the corresponding 16$\alpha$-hydroxy-17$\alpha$-acyloxy derivative which by further conventional acylation gives the respective 16,17-diesters with the same or different ester groups.

Alternatively, conventional acylation of the 16$\alpha$,17$\alpha$-diol in the absence of p-toluenesulfonic acid yields the corresponding 16$\alpha$-acryloxy-17$\alpha$-hydroxy compound which upon further conventional acylation in the presence of p-toluenesulfonic acid with the same or a different acylating agent gives the corresponding 16,17-diester with the same or different ester groups.

The following specific examples serve to illustrate but are not intended to limit the scope of the present invention:

PREPARATION 1

The compounds 16$\alpha$-methyl-$\Delta^5$-pregnene-3$\beta$,17$\alpha$-diol-20-one-17-acetate, 16$\beta$-methyl-$\Delta^5$-pregnene-3$\beta$,17$\alpha$-diol-20-one-17-acetate, 19-nor-$\Delta^5$-pregnene-3$\beta$-ol-20-one and $\Delta^5$-pregnen-3$\beta$,16$\alpha$,17$\alpha$-triol-20-one-16,17-acetophenonide were prepared in accordance with Zderic et al. U.S. patent application Serial No. 164,626, filed January 5, 1962, now Patent No. 3,071,581.

PREPARATION 2

A culture of *Streptomyces roseochromogenus* ATCC 3347 was prepared in an inclined agar medium containing 1% of glucose and 1% of yeast extract. 1 cc. of a suspension of this culture was then used to innoculate each one of a series of 250 cc. flasks containing 50 cc. of a sterilized aqueous medium of 2% peptone and 5% corn syrup, the mixtures were then incubated in a shaking machine at 28° C. under aeration for a period of 24–48 hours. There was thus obtained a vegetating growing culture of *Streptomyces roseochromogenus* which was used for the subsequent incubation of the steroid.

10 mg. of 19-nor-$\Delta^5$-pregnen-3$\beta$-ol-20-one-acetate (obtained by conventional acetylation of the free 3$\beta$-alcohol), were added to each 50 cc. of the vegetating culture of *Streptomyces roseochromogenus*, obtained as described above. The mixture was stirred for 48–72 hours with aeration and then extracted several times with methylene dichloride. The extract was washed with water, dried over anhydrous sodium sulfate, filtered and evaporated under reduced pressure.

The residue was purified by chromatography on silica gel thus giving 19-nor-$\Delta^5$-pregnene-3$\beta$,16$\alpha$-diol-20-one-3-acetate.

A solution of 8 g. of the latter steroid in 100 cc. of chloroform containing a few drops of pyridine was cooled to 0° C. and slowly treated under stirring with a cooled solution of chloride in chloroform containing 1.05 molar equivalents of chlorine. The mixture was allowed to reach room temperature, the excess of chlorine was removed by flushing with dry air and the solution was washed with 5% aqueous sodium bicarbonate solution and subsequently with water, dried over anhydrous sodium sulfate and evaporated to dryness. Crystallization of the residue from methanol-benzene afforded 5$\alpha$,6$\beta$-dichloro-19-nor-pregnane-3$\beta$,16$\alpha$-diol-20-one-3-acetate.

A solution of 5 g. of the latter 5$\alpha$,6$\beta$-dichloro compound in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 5$\alpha$,6$\beta$-dichloro-19-nor-pregnane-3$\beta$,16$\alpha$-diol-20-one-3-acetate-16-tosylate.

The total crude compound was kept at 50° C. with 5 g. of anhydrous sodium acetate and 160 cc. of ethanol during 2.5 hours. Chloroform and water were added. The aqueous layer was extracted several times with chloroform and the combined organic extracts were washed with concentrated sodium bicarbonate solution, then with water, dried over sodium sulfate and evaporated to dryness. Chromatography and recrystallization of the solid fractions from acetone-hexane afforded 5$\alpha$,6$\beta$-dichloro-19-nor-$\Delta^{16}$-pregnen-3$\beta$-ol-20-one-acetate.

50 cc. of dioxane containing 3 g. of the latter steroid and 3.46 cc. of pyridine were allowed to stand at room temperature for 6 days with 2.0 g. of osmium tetroxide. The mixture was then saturated with hydrogen sulfide and filtered through a pad of filter aid. The resultant colored filtrate was evaporated to dryness and taken up in 50 ml. of methanol. By stirring for 20 minutes with 10 g. of neutral alumina and 2 g. of decolorizing carbon and then filtering, the solution was almost completely decolorized and gave upon evaporation to dryness the crude material which was purified by chromatography on florisil. Recrystallization of the solid fractions from acetone-ether gave 5$\alpha$,6$\beta$-dichloro-19-nor-pregnane 3$\beta$,16$\alpha$,17$\alpha$-triol-20-one-3-acetate.

To 120 cc. of acetone containing 1 g. of the last named triol were added 30 drops of 78% perchloric acid. After 1 hour at room temperature 30 drops of pyridine were added and the resulting solution was evaporated to dryness under reduced pressure. 30 cc. of water were added to the residue and it was then extracted several times with 80 cc. of ethyl acetate. The combined extracts were washed to neutrality with water, dried over sodium sulfate and evaporated to dryness. The residue upon trituration with methanol gave a crude 16,17-acetonide. Recrystallization from the same solvent furnished 16$\alpha$,17$\alpha$-isopropylidendioxy-5$\alpha$,6$\beta$-dichloro-19-nor-pregnan-3$\beta$-ol-20-one-acetate.

A suspension of 1 g. of the later steroid in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 16α,17α-isopropylidendioxy-5α,6β-dichloro-19-nor-pregnan-3β-ol-20-one.

To a solution of 1 g. of the latter 5α,6β-dichloro-compound in 200 cc. of acetone, at room temperature and under a nitrogen atmosphere, there were added, 60 cc. of freshly prepared chromous chloride solution. After 5 minutes the acetone was removed under reduced pressure, water was added and the precipitate filtered off and dried. Recrystallization from acetone-hexane yielded 16α,17α-isopropylidendioxy-19-nor-$\Delta^5$-pregnene-3β-ol-20-one.

PREPARATION 3

A mixture of 6.6 g. of 19-nor-$\Delta^5$-pregnen-3β-ol-20-one, 2.7 g. of p-toluenesulfonic acid and 300 cc. of acetic anhydride was submitted to a slow distillation; during 5 hours. The residue was cooled and poured into iced water. The product was then extracted with ether, the extract washed successively with an aqueous solution of sodium carbonate and water to neutral, dried and evaporated to dryness. The residue consisted of 19-nor-$\Delta^{5,17(20)}$-pregnadiene-3β,20β-diol diacetate, which was utilized in the following step without purification.

6. g. of this crude diacetate were treated with 480 cc. of a 1.2 molar solution of perbenzoic acid in benzene (2.2 molar equivalents) at room temperature and in the dark, for 20 hours. Water was then added, the organic layer separated, washed with an aqueous solution of sodium bicarbonate, then with water, dried with anhydrous sodium sulfate and evaporated to dryness. The residue consisted of the crude 5α,6α;17α,20α-bisoxido-19-nor-pregnane-3β,20β-diol-diacetate.

This crude oxido compound was treated with 500 cc. of a 1% methanolic solution of potassium hydroxide at room temperature for 1 hour, the mixture was neutralized by addition of acetic acid, concentrated to small volume under reduced pressure, the product was precipitated by addition of ice water, filtered off, washed with water, dried and recrystallized from acetone-methanol, thus yielding 5α,6α - oxido - 19 - nor - pregnane - 3β,17α - diol - 20 - one-3-acetate.

To 5 g. of the latter steroid in 80 cc. of glacial acetic acid, there was added a mixture of 6 g. of sodium iodide, 1.6 g. of sodium acetate, 320 mg. of zinc and 2 drops of water. While cooling in an ice bath and stirring, there were added to the resulting mixture, 800 mg. of zinc dust in small portions. The stirring was continued for 6 hours and the temperature allowed to attain 25° C.

The reaction mixture was filtered and the filtrate diluted with ice water, alkalized with sodium bicarbonate and extracted with ethyl acetate. The extract was washed to neutral, dried over anhydrous sodium sulfate and evaporated to dryness. Crystallization from acetone-hexane yielded 19-nor-$\Delta^5$-pregnene,3β,17α-diol-20-one-3-acetate.

To a solution of 5 g. of the latter steroid in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-nor-$\Delta^5$-pregnene-3β,17α-diol-20-one-diacetate.

A suspension of 1 g. of the last named compound in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield 17α-acetoxy-19-nor-$\Delta^5$-pregnen-3β-ol-20-one.

PREPARATION 4

To a mixture of 1 g. of 5α,6β-dichloro-19-nor-$\Delta^{16}$-pregnen-3β-ol-20-one-acetate, 1 g. of cuprous chloride and 30 cc. of anhydrous tetrahydrofuran was added, while stirring and cooling, 50 cc. of tetrahydrofuran containing 5 mol. equiv. of methyl magnesium bromide.

The mixture was stirred for 2 hours at 28° C., then poured into ice-water, containing dilute hydrochloric acid. The product was extracted with methylene chloride, the extract washed to neutral with water and dried over anhydrous sodium sulfate. Evaporation of the solvent at reduced pressure gave a residue, which was purified by crystallization from methylene chloride-hexane to afford 16α-methyl-5α,6β-dichloro-19-nor-pregnan-3β-ol-20-one.

The latter compound was treated with chromous chloride solution, as described in Preparation 2, thus giving 16α-methyl-19-nor-$\Delta^5$-pregnen-3β-ol-20-one, which upon conventional acetylation in pyridine afforded 16α-methyl-19-nor-$\Delta^5$-pregnen-3β-ol-20-one-acetate.

The latter acetate was treated in accordance with Preparation 3, thus giving successively: 16α-methyl-19-nor-$\Delta^{5,17(20)}$-pregnadiene-3β,20β-diol-diacetate, 16α - methyl - $\Delta^{5,17(20)}$-pregnadiene-3β,20β-diol-diacetate, 16α - methyl - 5α,6α;17α,20α-bisoxido-19 - nor - pregnane - 3β,20β - diol-diacetate, 16α - methyl - 5α,6α - oxido - 19 - nor - pregnane-3β,17α-diol-20-one-3-acetate, 16α-methyl-19-nor-$\Delta^5$-pregnene - 3β,17α - diol - 20 - one - 3 - acetate, 16α - methyl-19-nor-$\Delta^5$-pregnene-3β,17α-diol-20 - one - diacetate and 16α-methyl-17α-acetoxy-19-nor-$\Delta^5$-pregnen-3β-ol-20-one.

PREPARATION 5

A cooled solution of 4 g. of 16α,17α-isopropylidendioxy-19-nor-$\Delta^5$-pregnen-3β-ol-20-one in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving 21-iodo-16α,17α - isopropylidendioxy - 19 - nor - $\Delta^5$ - pregnen - 3β-ol-20-one.

The crude product was dried in vacuum, dissolved in 20 cc. of acetonitrile and treated dropwise with 1.4 g. of silver fluoride dissolved in 3 cc. of water. After a short time, silver iodide started to separate leaving the 21-fluoro-pregnan derivative in solution. The mixture was kept for 24 hours at room temperature and filtered. Concentration of the filtrate under vacuum gave a crude product which after crystallization from methanol-acetone yielded 21 - fluoro-16α,17α-isopropylidendioxy-19-nor-$\Delta^5$-pregnen-3β-ol-20-one.

Following the same procedures 17α-acetoxy-19-nor-$\Delta^5$-pregnen-3β-ol-20-one and 16α-methyl-17α-acetoxy-19-nor-$\Delta^5$-pregnen-3β-ol-20-one were converted first into the corresponding 21-iodo derivatives and thereafter respectively into 21 - fluoro - 17α-acetoxy-19-nor-$\Delta^5$-pregnen-3β-ol-20-one and 16α-methyl-21-fluoro-17α-acetoxy-19-nor-$\Delta^5$-pregnen-3β-ol-20-one.

Example I

A mixture of 5 g. of 21-fluoro-16α-methyl-$\Delta^5$-pregnen-3β-ol-20-one (Petrow et al., J. Chem. Soc., 3595 (1959)), 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 20-cycloethylenedioxy - 21 - fluoro - 16α-methyl-$\Delta^5$-pregnen-3β-ol.

When applying the above procedure to the starting compounds listed under I there were obtained the products under II.

| I | II |
| --- | --- |
| 17α-acetoxy-16α-methyl-Δ⁵-pregnen-3β-ol-20-one. | 20-cycloethylenedioxy-17α-acetoxy-16α-methyl-Δ⁵-pregnen-3Δ-ol. |
| 17α-acetoxy-16β-methyl-Δ⁵-pregnen-3β-ol-20-one. | 20-cycloethylenedioxy-17α-acetoxy-16β-methyl-Δ⁵-pregnen-3β-ol. |
| 17α-acetoxy-Δ⁵-pregnen-3β-ol-20-one. | 20-cycloethylenedioxy-17α-acetoxy-Δ⁵-pregnen-3β-ol. |
| 16α-methyl-Δ⁵-pregnen-3β-ol-20-one. | 20-cycloethylenedioxy-16α-methyl-Δ⁵-pregnen-3β-ol. |
| 16β-methyl-Δ⁵-pregnen-3β-ol-20-one. | 20-cycloethylenedioxy-16β-methyl-Δ⁵-pregnen-3β-ol. |
| 19-nor-Δ⁵-pregnen-3β-ol-20-one. | 20-cycloethylenedioxy-19-nor-Δ⁵-pregnen-3β-ol. |
| Δ⁵-pregnen-3β,16α,17α-triol-20-one-16,17-acetonide. | 20-cycloethylenedioxy-Δ⁵-pregnen-3β,16α,17α-triol-16,17-acetonide. |
| Δ⁵-pregnen-3β,16α,17α-triol-20-one-16,17-acetophenonide. | 20-cycloethylenedioxy-Δ⁵-pregnen-3β,16α,17α-triol-16,17-acetophenonide. |
| 21-fluoro-Δ⁵-pregnen-3β-ol-20-one. | 20-cycloethylenedioxy-21-fluoro-Δ⁵-pregnen-3β-ol. |

*Example II*

A solution of 2.5 g. of 20-cycloethylenedioxy-21-fluoro-16α-methyl-Δ⁵-pregnen-3β-ol in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and then with water to neutral, dried over anhydrous sodium sulfate and evaporated to dryness. Crystallization from acetone-hexane gave 20-cycloethylenedioxy-21-fluoro-16α-methyl-5α,6α-oxido-pregnan-3β-ol.

The starting compounds listed below, were treated by the same procedure, thus yielding the corresponding products hereinafter disclosed.

| Starting compounds | Products |
| --- | --- |
| 20-cycloethylenedioxy-17α-acetoxy-16α-methyl-Δ⁵-pregnen-3β-ol. | 20-cycloethylenedioxy-17α-acetoxy-16α-methyl-5α,6α-oxido-pregnan-3β-ol. |
| 20-cycloethylenedioxy-17α-acetoxy-16β-methyl-Δ⁵-pregnen-3β-ol. | 20-cycloethylenedioxy-17α-acetoxy-16β-methyl-5α,6α-oxido-pregnan-3β-ol. |
| 20-cycloethylenedioxy-17α-acetoxy-Δ⁵-pregnen-3β-ol. | 20-cycloethylenedioxy-17α-acetoxy-5α,6α-oxido-pregnan-3β-ol. |
| 20-cycloethylenedioxy-16α-methyl-Δ⁵-pregnen-3β-ol. | 20-cycloethylenedioxy-16α-methyl-5α,6α-oxido-pregnan-3β-ol. |
| 20-cycloethylenedioxy-16β-methyl-Δ⁵-pregnen-3β-ol. | 20-cycloethylenedioxy-16β-methyl-5α,6α-oxido-pregnan-3β-ol. |
| 20-cycloethylenedioxy-19-nor-Δ⁵-pregnen-3β-ol. | 20-cycloethylenedioxy-19-nor-5α,6α-oxido-pregnan-3β-ol. |
| 20-cycloethylenedioxy-Δ⁵-pregnen-3β,16α,17α-triol-16,17-acetonide. | 20-cycloethylenedioxy-5α,6α-oxido-pregnan-3β-16α-17α-triol-16,17-acetonide. |
| 20-cycloethylenedioxy-Δ⁵-pregnen-3β,16α,17α-triol-16,17-acetophenonide. | 20-cycloethylenedioxy-5α,6α-oxido-pregnan-3β,16α,17α-triol-16,17-acetophenonide. |
| 20-cycloethylenedioxy-21-fluoro-Δ⁵-pregnen-3β-ol. | 20-cycloethylenedioxy-21-fluoro-5α,6α-oxido-pregnan-3β-ol. |

*Example III*

To a solution of 80 cc. of 4 N methylmagnesium bromide in ether was added, with stirring, a solution of 2 g. of 20-cycloethylenedioxy-21-fluoro-16α-methyl-5α,6α-oxido-pregnan-3β-ol, in 60 cc. of dry tetrahydrofuran and the stirred mixture heated under reflux for 30 minutes. The condenser was then replaced by a calcium chloride tube, the ether allowed to boil off and when the internal temperature reached 54° C., the condenser was readapted and the mixture refluxed for an additional 4 hours. 400 cc. of a saturated solution of ammonium chloride was added slowly to the cooled mixture which was then stirred for 15 minutes before transfer to a separatory funnel. The tetrahydrofuran layer was separated, dried and evaporated, whereupon crystallization of the residue from aqueous methanol gave 20-cycloethylenedioxy-21-fluoro-6β,16α-dimethyl-pregnan-3β,5α-diol.

The starting compounds under I were treated following the above method, thus affording the corresponding products under II.

| I | II |
| --- | --- |
| 20-cycloethylenedioxy-17α-acetoxy-16α-methyl-5α,6α-oxido-pregnan-3β-ol. | 20-cycloethylenedioxy-6β,16α-dimethyl-pregnan-3β,5α-17α-triol. |
| 20-cycloethylenedioxy-17α-acetoxy-16β-methyl-5α,6α-oxido-pregnan-3β-ol. | 20-cycloethylenedioxy-6β,16β-dimethyl-pregnan-3β,5α, 17α-triol. |
| 20-cycloethylenedioxy-17α-acetoxy-5α,6α-oxido-pregnan-3β-ol. | 20-cycloethylenedioxy-6β-methyl-pregnan-3β,5α,17α-triol. |
| 20-cycloethylenedioxy-16α-methyl-5α,6α-oxido-pregnan-3β-ol. | 20-cycloethylenedioxy-6β,16α-dimethyl-pregnan-3β,5α-diol. |
| 20-cycloethylenedioxy-16β-methyl-5α,6α-oxido-pregnan-3β-ol. | 20-cycloethylenedioxy-6β,16β-dimethyl-pregnan-3β,5α-diol. |
| 20-cycloethylenedioxy-19-nor-5α,6α-oxido-pregnan-3β-ol. | 20-cycloethylenedioxy-6β-methyl-19-nor-pregnan-3β,5α-diol. |
| 20-cycloethylenedioxy-5α,6α-oxido-pregnan-3β,16α,17α-triol-16,17-acetonide. | 20-cycloethylenedioxy-6β-methyl-pregnan-3β,5α,16α,17α-tetrol-16,17-acetonide. |
| 20-cycloethylenedioxy-5α,6α-oxido-pregnan-3β,16α,17α-triol-16,17-acetophenonide. | 20-cycloethylenedioxy-6β-methyl-pregnan-3β,5α,16α17α-tetrol-16,17-acetophenonide. |
| 20-cycloethylenedioxy-21-fluoro-5α,6α-oxido-pregnan-3β-ol. | 20-cycloethylenedioxy-6β-methyl-21-fluoro-pregnan-3β-5α-diol. |

*Example IV*

A mixture of 1 g. of 20-cycloethylenedioxy-21-fluoro-6β,16α-dimethyl-pregnan-3β,5α-diol, 4 cc. of pyridine and 2 cc. of acetic anhydride was kept at room temperature overnight, poured into ice water, the formed precipitate was filtered, washed with water and dried. Crystallization from acetone-hexane gave 20-cycloethylenedioxy-21-fluoro-6β,16α-dimethyl-pregnan-3β,5α-diol-3-acetate.

When applying the above technique to the starting compounds listed below, there were obtained the corresponding disclosed products.

| Starting compounds | Products |
| --- | --- |
| 20-cycloethylenedioxy-6β-16α-dimethyl-pregnan-3β,5α-17α-triol. | 20-cycloethylenedioxy-3β-acetoxy-6β,16α-dimethyl-pregnan-5α,17α-diol. |
| 20-cycloethylenedioxy-6β-16β-dimethyl-pregnan-3β,5α,17α-triol. | 20-cycloethylenedioxy-3β-acetoxy-6β,16β-dimethyl-pregnan-5α,17α-diol. |
| 20-cycloethylenedioxy-6β-methyl-pregnan-3β,5α,17α-triol. | 20-cycloethylenedioxy-3β-acetoxy-6β-methyl-pregnan-5α,17α-diol. |
| 20-cycloethylenedioxy-6β,16α-dimethyl-pregnan-3β,5α-diol. | 20-cycloethylenedioxy-3β-acetoxy-6β,16α-dimethyl-pregnan-5α-ol. |
| 20-cycloethylenedioxy-6β-16β-dimethyl-pregnan-3β,5α-diol. | 20-cycloethylenedioxy-3β-acetoxy-6β-16β-dimethyl-pregnan-5α-ol. |
| 20-cycloethylenedioxy-6β-methyl-19-nor-pregnan-3β,5α-diol. | 20-cycloethylenedioxy-3β-acetoxy-6β-methyl-19-nor-pregnan-5α-ol. |
| 20-cycloethylenedioxy-6β-methyl-pregnan-3β,5α,16α,17α-tetrol-16,17-acetonide. | 20-cycloethylenedioxy-3β-acetoxy-6β-methyl-pregnan-5α,16α,17α-triol-16,17 acetonide. |
| 20-cycloethylenedioxy-6β-methyl-pregnan-3β,5α,16α,17α-tetrol-16,17-acetophenonide. | 20-cycloethylenedioxy-3β-acetoxy-6β-methyl-pregnan-5α,16α,17α-triol-16,17-acetophenonide. |
| 20-cycloethylenedioxy-6β-methyl-21-fluoro-pregnan-3β,5α-diol. | 20-cycloethylenedioxy-3β-acetoxy-6β-methyl-21-fluoro-pregnan-5α-ol. |

*Example V*

A mixture of 5 g. of 20-cycloethylenedioxy-21-fluoro-6β,16α-dimethyl-pregnan-3β,5α-diol-3-acetate, 400 cc. of acetic anhydride and 1 drop of concentrated sulfuric acid was stirred at room temperature overnight. The resulting solution was then poured into water and the product extracted with methylene chloride. The extract was washed with a 10% aqueous sodium bicarbonate solution, then with water to neutral, dried and evaporated to dryness. Alumina chromatography followed by crystallization of the solid fractions gave 21-fluoro-6,16α-dimethyl-Δ⁵-pregnen-3β-ol-20-one acetate.

The starting compounds listed below were treated by the foregoing technique, thus yielding the corresponding products hereinafter disclosed.

| Starting compounds | Products |
| --- | --- |
| 20-cycloethylenedioxy-3β-acetoxy-6β,16α-dimethyl-pregnan-5α,17α-diol. | 3β,17α-diacetoxy-6,16α-di-methyl-Δ5-pregnen-20-one. |
| 20-cycloethylenedioxy-3β-acetoxy-6β,16β-dimethyl-pregnan-5α,17α-diol. | 3β,17α-diacetoxy-6,16β-di-methyl-Δ5-pregnen-20-one. |
| 20-cycloethylenedioxy-3β-acetoxy-6β-methyl-pregnan-5α,17α-diol. | 3β,17α-diacetoxy-6-methyl-Δ5-pregnen-20-one. |
| 20-cycloethylenedioxy-3β-acetoxy-6β,16α-dimethyl-pregnan-5α-ol. | 3β-acetoxy-6,16α-dimethyl-Δ5-pregnen-20-one. |
| 20-cycloethylenedioxy-3β-acetoxy-6β,16β-dimethyl-pregnan-5α-ol. | 3β-acetoxy-6,16β-dimethyl-Δ5-pregnen-20-one. |
| 20-cycloethylenedioxy-3β-acetoxy-6β-methyl-19-nor-pregnan-5α-ol. | 3β-acetoxy-6-methyl-19-nor-Δ5-pregnen-20-one. |
| 20-cycloethylenedioxy-3β-acetoxy-6β-methyl-pregnan-5α,16α,17α-triol-16,17-acetonide. | 3β-acetoxy-6-methyl-Δ5-pregnen-16α,17α-diol-20-one-16,17-acetonide. |
| 20-cycloethylenedioxy-3β-acetoxy-6β-methyl-pregnan-5α,16α,17α-triol-16,17-acetophenonide. | 3β-acetoxy-6-methyl-Δ5-pregnen-16α,17α-diol-20-one-16,17-acetophenonide. |
| 20-cycloethylenedioxy-3β-acetoxy-6β-methyl-21-fluoro-pregnan-5α-ol. | 3β-acetoxy-6-methyl-21-fluoro-Δ5-pregnen-20-one. |

Example VI 2 g. of 21-fluoro-6,16α-dimethyl-Δ5-pregnen-3β-ol-20-one-acetate was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 21-fluoro-6,16α-dimethyl-Δ5-pregnen-3β-ol-20-one.

Following the above technique, there were treated the starting compounds under I, yielding the corresponding products under II.

| I | II |
| --- | --- |
| 3β,17α-diacetoxy-6,16α-dimethyl-Δ5-pregnen-20-one. | 17α-acetoxy-6,16α-dimethyl-Δ5-pregnen-3β-ol-20-one. |
| 3β,17α-diacetoxy-6,16β-dimethyl-Δ5-pregnen-20-one. | 17α-acetoxy-6,16β-dimethyl-Δ5-pregnen-3β-ol-20-one. |
| 3β-17α-diacetoxy-6-methyl-Δ5-pregnen-20-one. | 17α-acetoxy-6-methyl-Δ5-pregnen-3β-ol-20-one. |
| 3β-acetoxy-6,16α-dimethyl-Δ5-pregnen-20-one. | 6,16α-dimethyl-Δ5-pregnen-3β-ol-20-one. |
| 3β-acetoxy-6,16β-dimethyl-Δ5-pregnen-20-one. | 6,16β-dimethyl-Δ5-pregnen-3β-ol-20-one. |
| 3β-acetoxy-6-methyl-19-nor-Δ5-pregnen-20-one. | 6-methyl-19-nor-Δ5-pregnen-3β-ol-20-one. |
| 3β-acetoxy-6-methyl-Δ5-pregnen-16α,17α-diol-20-one-16,17-acetonide. | 6-methyl-Δ5-pregnen-3β,16α,17α-triol-20-one-16,17-acetonide. |
| 3β-acetoxy-6-methyl-Δ5-pregnen-16α,17α-diol-20-one-16,17-acetophenonide. | 6-methyl-Δ5-pregnen-3β,16α,17α-9-ethyl-Δ5-pregnen-3β-16α,17α-triol-20-one-16,17-acetophenonide. |
| 3β-acetoxy-6-methyl-21-fluoro-Δ5-pregnen-20-one. | 6-methyl-21-fluoro-Δ5-pregnen-3β-ol-20-one. |

Example VII

A solution of 5 g. of 21-fluoro-6,16α-dimethyl-Δ5-pregnen-3β-ol-20-one obtained in accordance with the foregoing example, in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 3-tosylate of 21-fluoro-6,16α-dimethyl-Δ5-pregnen-3β-ol-20-one.

The total crude compound was refluxed with 5 g. of anhydrous sodium acetate and 60 cc. of glacial acetic acid during 2 hours. Chloroform and water were added. The aqueous layer was extracted several times with chloroform and the combined organic extracts were washed with concentrated sodium bicarbonate solution then with water, dried over sodium sulfate and evaporated to dryness. Chromatography and recrystallization of the solid fractions from acetone-hexane afforded 21-fluoro-6,16α-dimethyl-Δ3,5-pregnadien-20-one.

The starting compounds listed below, were treated by the foregoing procedures, thus yielding first the respective 3-tosylates and then the corresponding products hereinafter disclosed.

| Starting compounds | Products |
| --- | --- |
| 17α-acetoxy-6,16α-dimethyl-Δ5-pregnen-3β-ol-20-one. | 17α-acetoxy-6,16α-dimethyl-Δ3,5-pregnadien-20-one. |
| 17α-acetoxy-6,16β-dimethyl-Δ5-pregnen-3β-ol-20-one. | 17α-acetoxy-6,16β-dimethyl-Δ3,5-pregnadien-20-one. |
| 17α-acetoxy-6-methyl-Δ5-pregnen-3β-ol-20-one. | 17α-acetoxy-6-methyl-Δ3,5-pregnadien-20-one. |
| 6,16α-dimethyl-Δ5-pregnen-3β-ol-20-one. | 6,16α-dimethyl-Δ3,5-pregnadien-20-one. |
| 6,16β-dimethyl-Δ5-pregnen-3β-ol-20-one. | 6,16α-dimethyl-Δ3,5-pregnadien-20-one. |
| 6-methyl-19-nor-Δ5-pregnen-3β-ol-20-one. | 6-methyl-19-nor-Δ3,5-pregnadien-20-one. |
| 6-methyl-Δ5-pregnen-3β,16α,17α-triol-20-one-16,17-acetonide. | 6-methyl-Δ3,5-pregnadien-16α,17α-diol-20-one-16,17-acetonide. |
| 6-methyl-Δ5-pregnen-3β,16α,17α-triol-20-one-16,17-acetophenonide. | 6-methyl-Δ3,5-pregnadien-16α,17α-diol-20-one-16,17-acetophenonide. |
| 6-methyl-21-fluoro-Δ5-pregnen-3β-ol-20-one. | 6-methyl-21-fluoro-Δ3,5-pregnadien-20-one. |

Example VIII

A solution of 0.17 g. of potassium hydroxide in 0.2 cc. of water and 2.5 cc. of methanol was added over 30 minutes to a boiling solution of 1 g. of 17α-acetoxy-5,16α-dimethyl-Δ3,5-pregnadien-20-one in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 6,16α-dimethyl-Δ3,5-pregnadien-17α-ol-20-one.

When applying the same technique to 17α-acetoxy-6,16β-dimethyl-Δ3,5-pregnadien-20-one and 17α-acetoxy-6-methyl-Δ3,5-pregnadien-20-one, there were respectively obtained 6,16β-dimethyl-Δ3,5-pregnadien-17α-ol-20-one and 6-methyl-Δ3,5-pregnadien-17α-ol-20-one.

Example IX

To a solution of 5 g. of 6,16α-dimethyl-Δ3,5-pregnadien-17α-ol-20-one in 100 cc. of anhydrous benzene there were added 1 g. of p-toluenesulfonic acid and 10 cc. of propionic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 6,16α-dimethyl-Δ3,5-pregnadien-17α-ol-20-one-propionate.

Following the same procedure there were treated 6,16β-dimethyl-Δ3,5-pregnadien-17α-ol-20-one and 6-methyl-Δ3,5-pregnadien-17α-ol-20-one giving respectively 6,16β-dimethyl-Δ3,5-pregnadien-17α-ol-20-one-propionate and 6-methyl-Δ3,5-pregnadien-17α-ol-20-one-propionate.

Example X

Using the same conditions as in the foregoing example but substituting propionic anhydride by caproic anhydride, there were obtained 6,16α-dimethyl-Δ3,5-pregnadien-17α-ol-20-one-caproate, 6,16β-dimethyl-Δ3,5-pregnadien-17α-ol-20-one-caproate and 6-methyl-Δ3,5-pregnadien-17α-ol-20-one-caproate.

Example XI 1 g. of 6-methyl-Δ3,5-pregnadien-16α,17α-diol-20-one-16,17-acetonide was heated on the steam bath with 20 cc. of 60% formic acid for 1 hour, cooled, diluted with water and the precipitate was collected, washed with water, dried, and recrystallized from acetone-hexane, thus affording 6-methyl-Δ3,5-pregnadien-16α,17α-diol-20-one.

Example XII

A mixture of 1 g. of the foregoing compound, 4 cc. of pyridine and 2 cc. of acetic anhydride was kept at room temperature overnight, poured into ice water, the formed precipitate was filtered, washed with water and dried. Crystallization from acetone-hexane gave 6-methyl-$\Delta^{3,5}$-pregnadien-$16\alpha,17\alpha$-diol-20-one-16-acetate.

Example XIII

The latter compound was treated following the technique described in Example X, thus yielding 6-methyl-$\Delta^{3,5}$-pregnadien-$16\alpha,17\alpha$-diol-20-one-16-acetate-17-caproate.

Example XIV 6-methyl-$\Delta^{3,5}$-pregnadien-$16\alpha,17\alpha$-diol-20-one was treated following the procedure delineated in Example IX, thus yielding 6-methyl-$\Delta^{3,5}$-pregnadien-$16\alpha,17\alpha$-diol-20-one-16,17-dipropionate.

Example XV 2 g. of the preceding dipropionate were dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 6-methyl-$\Delta^{3,5}$-pregnadien-$16\alpha,17\alpha$-diol-20-one-17-propionate.

Example XVI

The latter monoester was acetylated by the procedure described in Example XII, thus yielding 6-methyl-$\Delta^{3,5}$-pregnadien-$16\alpha,17\alpha$-diol-20-one-16-acetate-17-propionate.

Example XVII $16\alpha,17\alpha$-isopropylidendioxy-19-nor-$\Delta^5$-pregnen-$3\beta$-ol-20-one was successively treated in accordance with Examples I, II, III, IV, V, VI, VII and XI thus affording respectively $16\alpha,17\alpha$-isopropylidendioxy-20-cycloethylene-dioxy-19-nor-$\Delta^5$-pregnen-$3\beta$-ol, $16\alpha,17\alpha$-isopropylidendioxy-20-cycloethylenedioxy-$5\alpha,6\alpha$-oxido-19-nor-pregnan-$3\beta$-ol, $16\alpha,17\alpha$-isopropylidendioxy-20-cycloethylenedioxy-$6\beta$-methyl-19-nor-pregnane-$3\beta,5\alpha$-diol, $16\alpha,17\alpha$-isopropylidendioxy-20-cycloethylenedioxy-$6\beta$-methyl-19-nor-pregnane-$3\beta,5\alpha$-diol-3-acetate, $16\alpha,17\alpha$-isopropylidendioxy-6-methyl-19-nor-$\Delta^5$-pregnen-$3\beta$-ol-20-one-acetate, $16\alpha,17\alpha$-isopropylidendioxy-6-methyl-19-nor-$\Delta^5$-pregnen-$3\beta$-ol-20-one, $16\alpha,17\alpha$-isopropylidendioxy-6-methyl-19-nor-$\Delta^{3,5}$-pregnadien-20-one and 6-methyl-19-nor-$\Delta^{3,5}$-pregnadiene-$16\alpha,17\alpha$-diol-20-one.

Example XVIII $17\alpha$-acetoxy-19-nor-$\Delta^5$-pregnen-$3\beta$-ol-20-one was treated following consecutively the procedures described in Examples I, II, III, IV, V, VI, VII and VIII, giving respectively 20-cycloethylenedioxy-$17\alpha$-acetoxy-19-nor-$\Delta^5$-pregnen-$3\beta$-ol, 20-cycloethylenedioxy-$17\alpha$-acetoxy-$5\alpha,6\alpha$-oxido-19-nor-pregnan-$3\beta$-ol, 20-cycloethylenedioxy-$6\beta$-methyl-19-nor-pregnane-$3\beta,5\alpha,17\alpha$-triol, 20-cycloethylenedioxy-$6\beta$-methyl-19-nor-pregnane-$3\beta,5\alpha,17\alpha$-triol-3-acetate, $3\beta,17\alpha$-diacetoxy-6-methyl-19-nor-$\Delta^5$-pregnen-20-one, $17\alpha$-acetoxy-6-methyl-19-nor-$\Delta^5$-pregnen-$3\beta$-ol-20-one, $17\alpha$-acetoxy-6-methyl-19-nor-$\Delta^{3,5}$-pregnadien-20-one and 6-methyl-19-nor-$\Delta^{3,5}$-pregnadien-$17\alpha$-ol-20-one.

Example XIX $16\alpha$-methyl-$17\alpha$-acetoxy-19-nor-$\Delta^5$-pregnen-$3\beta$-ol-20-one was successively treated according to Examples I, II, III, IV, V, VI, VII and VIII, yielding respectively 20-cycloethylenedioxy-$17\alpha$-acetoxy-$16\alpha$-methyl-19-nor-$\Delta^5$-pregnen-$3\beta$-ol, 20-cycloethylenedioxy-$17\alpha$-acetoxy-$16\alpha$-methyl-$5\alpha,6\alpha$-oxido-19-nor-pregnan-$3\beta$-ol, 20-cycloethylene-dioxy-$6\beta,16\alpha$-dimethyl-19-nor-pregnane-$3\beta,5\alpha,17\alpha$-triol, 20-cycloethylenedioxy-$6\beta,16\alpha$-dimethyl-19-nor-pregnane-$3\beta,5\alpha,17\alpha$-triol-3-acetate, $3\beta,17\alpha$-diacetoxy-$6,16\alpha$-dimethyl-19-nor-$\Delta^5$-pregnen-20-one, $17\alpha$-acetoxy-$6,16\alpha$-dimethyl-19-nor-$\Delta^5$-pregnen-$3\beta$-ol-20-one, $17\alpha$-acetoxy-$6,16\alpha$-dimethyl-19-nor-$\Delta^{3,5}$-pregnadien-20-one and $6,16\alpha$-dimethyl-19-nor-$\Delta^{3,5}$-pregnadien-$17\alpha$-ol-20-one.

Example XX 21-fluoro-$16\alpha,17\alpha$-isopropylidendioxy-19-nor-$\Delta^5$-pregnen-$3\beta$-ol-20-one was successively treated in accordance with Examples I, II, III, IV, V, VI, VII and XI thus affording respectively 21-fluoro-$16\alpha,17\alpha$-isopropylidendioxy-20-cycloethylenedioxy-19-nor-$\Delta^5$-pregnen-$3\beta$-ol, 21-fluoro-$16\alpha,17\alpha$-isopropylidendioxy-20-cycloethylenedioxy-$5\alpha,6\alpha$-oxido-19-nor-pregnan-$3\beta$-ol, 21-fluoro-$16\alpha,17\alpha$-isopropylidendioxy-20-cycloethylenedioxy-$6\beta$-methyl-19-nor-pregnane-$3\beta,5\alpha$-diol, 21-fluoro-$16\alpha,17\alpha$-isopropylidendioxy-20-cycloethylenedioxy-$6\beta$-methyl-19-nor-pregnane-$3\beta,5\alpha$-diol-3-acetate, 21-fluoro-$16\alpha,17\alpha$-isopropylidendioxy-6-methyl-19-nor-$\Delta^5$-pregnen-$3\beta$-ol-20-one-acetate, 21-fluoro-$16\alpha,17\alpha$-isopropylidendioxy-6-methyl-19-nor-$\Delta^5$-pregnen-$3\beta$-ol-20-one, 21-fluoro-$16\alpha,17\alpha$-isopropylidendioxy-6-methyl-19-nor-$\Delta^{3,5}$-pregnadien-20-one and 21-fluoro-6-methyl-19-nor-$\Delta^{3,5}$-pregnadiene-$16\alpha,17\alpha$-diol-20-one.

Example XXI 21-fluoro-$17\alpha$-acetoxy-19-nor-$\Delta^5$-pregnen-$3\beta$-ol-20-one was treated following consecutively the procedures described in Examples I, II, III, IV, V, VI, VII and VIII, giving respectively 21-fluoro-20-cycloethylenedioxy-$17\alpha$-acetoxy-19-nor-$\Delta^5$-pregnen-$3\beta$-ol, 21-fluoro-20-cycloethylene-dioxy-$17\alpha$-acetoxy-$5\alpha,6\alpha$-oxido-19-nor-pregnan-$3\beta$-ol, 21-fluoro-20-cycloethylenedioxy-$6\beta$-methyl-19-nor-pregnane-$3\beta,5\alpha,17\alpha$-triol, 21-fluoro-20-cycloethylenedioxy-$6\beta$-methyl-19-nor-pregnane-$3\beta,5\alpha,17\alpha$-triol-3-acetate, 21-fluoro-$3\beta,17\alpha$-diacetoxy-6-methyl-19-nor-$\Delta^5$-pregnen-20-one, 21-fluoro-$17\alpha$-acetoxy-6-methyl-19-nor-$\Delta^5$-pregnen-$3\beta$-ol-20-one, 21-fluoro-$17\alpha$-acetoxy-6-methyl-19-nor-$\Delta^{3,5}$-pregnadien-20-one and 21-fluoro-6-methyl-19-nor-$\Delta^{3,5}$-pregnadien-$17\alpha$-ol-20-one,

Example XXII 21-fluoro-$16\alpha$-methyl-$17\alpha$-acetoxy-19-nor-$\Delta^5$-pregnen-$3\beta$-ol-20-one was successively treated according to Examples I, II, III, IV, V, VI, VII and VIII yielding respectively 21-fluoro-20-cycloethylenedioxy-$17\alpha$-acetoxy-$16\alpha$-methyl-19-nor-$\Delta^5$-pregnen-$3\beta$-ol, 21-fluoro-20-cycloethylenedioxy-$17\alpha$-acetoxy-$16\alpha$-methyl-$5\alpha,6\alpha$-oxido-19-nor-pregnan-$3\beta$-ol, 21-fluoro-20-cycloethylenedioxy-$6\beta,16\alpha$-dimethyl-19-nor-pregnane-$3\beta,5\alpha,17\alpha$-triol, 21-fluoro-20-cycloethylenedioxy-6β,16α-dimethyl-19-nor-pregnane-3β,5α,17α-triol-3-acetate,
21-fluoro-3β,17α-diacetoxy-6,16α-dimethyl-19-nor-Δ⁵-pregnen-20-one,
21-fluoro-17α-acetoxy-6,16α-dimethyl-19-nor-Δ⁵-pregnen-3β-ol-20-one,
21-fluoro-17α-acetoxy-6,16α-dimethyl-19-nor-Δ³,⁵-pregnadien-20-one and
21-fluoro-6,16α-dimethyl-19-nor-Δ³,⁵-pregnadien-17α-ol-20-one.

We claim:
1. A compound of the following formula:

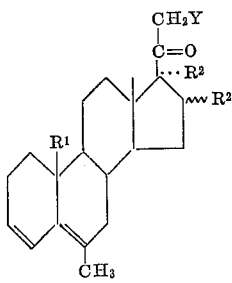

wherein Y is selected from the group consisting of hydrogen and fluorine; R¹ is a member of the group consisting of hydrogen and methyl; R² is selected from the group consisting of hydroxyl and a hydrocarbon carboxylic acyloxy group of less than 12 carbon atoms; R³ is a member of the group consisting of hydrogen, α-methyl, β-methyl, α-hydroxyl and an α-hydrocarbon carboxylic acyloxy group of less than 12 carbon atoms; R² and R³ together are in addition, the group

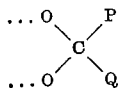

wherein P is a lower alkyl group and Q is selected from the group consisting of a lower alkyl, an aryl and an aralkyl group, each containing up to 8 carbon atoms.

2. 17α-acetoxy-6,16α-dimethyl-Δ³,⁵-pregnadien-20-one.
3. 17α-acetoxy-6,16β-dimethyl-Δ³,⁵-pregnadien-20-one.
4. 17α-acetoxy-6-methyl-Δ³,⁵-pregnadien-20-one.
5. 6,16α-dimethyl-Δ³,⁵-pregnadien-20-one.
6. 6,16β-dimethyl-Δ³,⁵-pregnadien-20-one.
7. 6-methyl-19-nor-Δ³,⁵-pregnadien-20-one.
8. 6 - methyl- Δ³,⁵ - pregnadien - 16,17α - diol - 20-one-16,17-acetonide.
9. 6 - methyl - Δ³,⁵ - pregnadien - 16α,17α - diol - 20-one-16,17-acetophenonide.
10. 6 - methyl - Δ³,⁵ - pregnadien - 16α,17α - diol - 20-one-17-propionate.
11. 6 - methyl - Δ³,⁵ - pregnadien - 16α,17α - diol - 20-one-16,17-dipropionate.
12. 6 - methyl - Δ³,⁵ - pregnadien-16α,17α1diol-20-one-16-acetate-17-caproate.
13. 6 - methyl - Δ³,⁵ - pregnadien - 16α,17α - diol - 20-one-16-acetate-17-propionate.
14. 21-fluoro-6,16α-dimethyl-Δ³,⁵-pregnadien-20-one.
15. 21-fluoro-6-methyl-Δ³,⁵-pregnadien-20-one.
16. In the process for the production of 6-methyl-Δ³,⁵-pregnadiene derivatives the steps which comprise treating the corresponding 3β-hydroxy-6-methyl-Δ⁵-pregnene with a lower hydrocarbon sulfonic acid chloride in a tertiary amine and treating the resultant 3β-sulfonate with an alkali metal lower hydrocarbon carboxylic acylate in a lower hydrocarbon carboxylic acid.
17. The process of claim 16 wherein the lower hydrocarbon sulfonic acid chloride is p-toluenesulfonic acid chloride, the tertiary amine is pyridine, the alkali metal lower hydrocarbon carboxylic acylate is sodium acetate and the lower hydrocarbon carboxylic acid is acetic acid.

No references cited.